United States Patent
Anderson

(10) Patent No.: US 9,529,599 B2
(45) Date of Patent: Dec. 27, 2016

(54) DYNAMIC PROPAGATION WITH ITERATIVE PIPELINE PROCESSING

(71) Applicant: William Erik Anderson, Albuquerque, NM (US)

(72) Inventor: William Erik Anderson, Albuquerque, NM (US)

(*) Notice: Subject to any disclaimer, the term of this patent is extended or adjusted under 35 U.S.C. 154(b) by 826 days.

(21) Appl. No.: 13/764,905

(22) Filed: Feb. 12, 2013

(65) Prior Publication Data

US 2013/0212352 A1    Aug. 15, 2013

Related U.S. Application Data

(60) Provisional application No. 61/597,926, filed on Feb. 13, 2012.

(51) Int. Cl.
| | | |
|---|---|---|
| *G06F 15/00* | (2006.01) | |
| *G06F 7/38* | (2006.01) | |
| *G06F 9/00* | (2006.01) | |
| *G06F 9/44* | (2006.01) | |
| *G06F 9/38* | (2006.01) | |
| *G06F 9/30* | (2006.01) | |

(52) U.S. Cl.
CPC ......... *G06F 9/3867* (2013.01); *G06F 9/30065* (2013.01); *G06F 9/3869* (2013.01)

(58) Field of Classification Search
None
See application file for complete search history.

(56) References Cited

U.S. PATENT DOCUMENTS

| | | | | |
|---|---|---|---|---|
| 2003/0093656 A1* | 5/2003 | Masse | ....................... | G06F 5/01 712/241 |
| 2003/0177343 A1* | 9/2003 | Magoshi | ................. | G06F 9/325 712/241 |
| 2004/0015934 A1* | 1/2004 | Muthukumar | ........ | G06F 8/4452 717/160 |
| 2004/0083255 A1* | 4/2004 | Hinds | ................... | G06F 7/5375 708/650 |
| 2007/0186083 A1* | 8/2007 | Vermeire | .............. | G06F 9/3802 712/241 |
| 2009/0228690 A1* | 9/2009 | Muff | ..................... | G06F 9/3838 712/219 |

* cited by examiner

*Primary Examiner* — George Giroux

(57) ABSTRACT

Systems, apparatuses, methods, and software for processing data in pipeline architectures are provided herein. In one example, a pipeline architecture is presented. The pipeline architecture includes a plurality of processing stages, linked in series, that iteratively process data as the data propagates through the plurality of processing stages. The pipeline architecture includes at least one other processing stage linked in series with and preceded by the plurality of processing stages and configured to iteratively process the data a number of times based at least on an iteration count comprising how many times the data was iteratively processed as the data propagated through the plurality of processing stages.

22 Claims, 10 Drawing Sheets

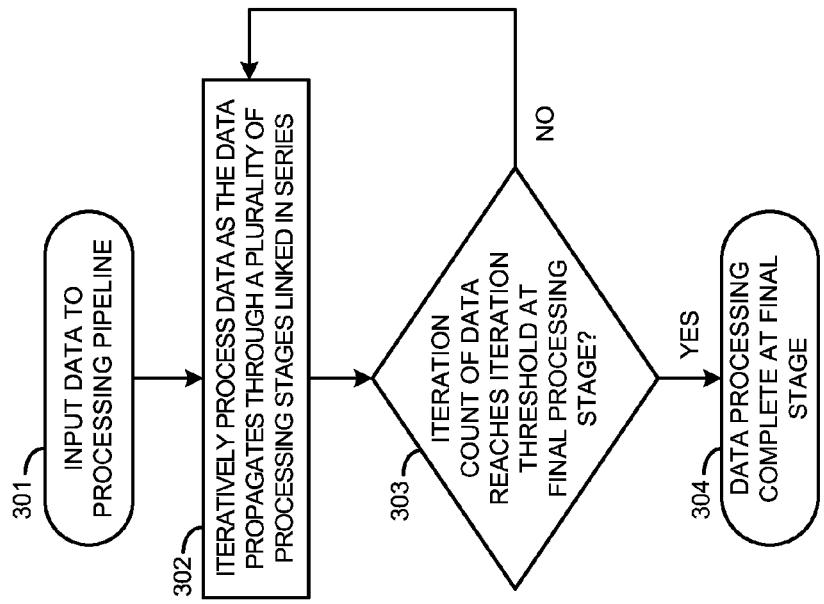
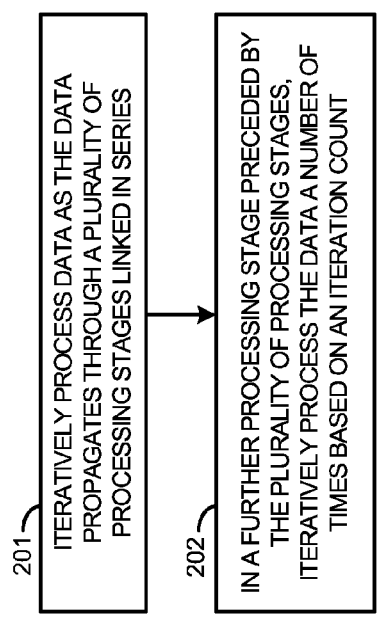

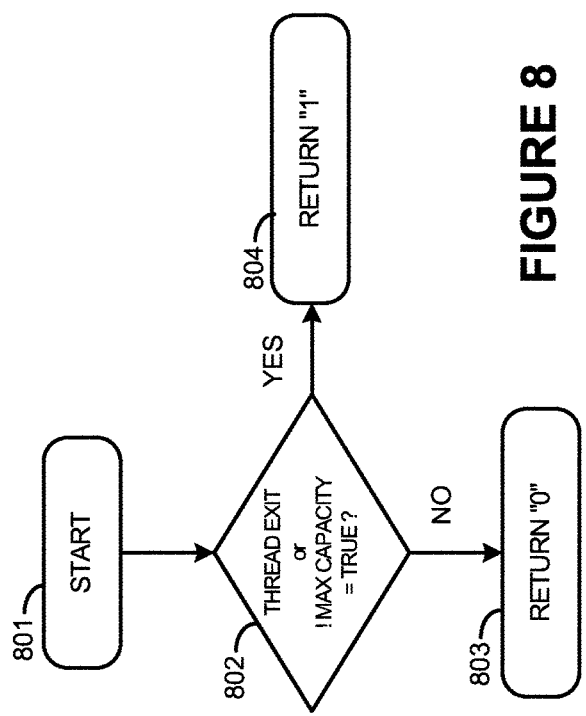

| CLOCK | PROC. STAGE | SUB-PIPELINE STAGE | DATA THREAD | PIPE FULL | GATE OPEN | THREAD EXIT | ITERATION COUNT | THREAD COUNT |
|---|---|---|---|---|---|---|---|---|
| 1 | 1 | 1 | D1 | TRUE | TRUE |  | 1 | 1 |
|   |   | 2 | x | FALSE |  |  | 0 | 0 |
|   | 2 | 1 | x | FALSE | TRUE |  | 0 | 0 |
|   |   | 2 | x | FALSE |  | FALSE | 0 | 0 |
| 2 | 1 | 1 | D2 | TRUE | TRUE |  | 1 | 1 |
|   |   | 2 | D1 | TRUE |  |  | 1 | 1 |
|   | 2 | 1 | x | FALSE | TRUE |  | 0 | 0 |
|   |   | 2 | x | FALSE |  | FALSE | 0 | 0 |
| 3 | 1 | 1 | x | FALSE | TRUE |  | 0 | 1 |
|   |   | 2 | D2 | TRUE |  |  | 1 | 1 |
|   | 2 | 1 | D1 | TRUE | TRUE |  | 2 | 1 |
|   |   | 2 | x | FALSE |  | FALSE | 0 | 0 |
| 4 | 1 | 1 | D3 | TRUE | TRUE |  | 1 | 2 |
|   |   | 2 | x | FALSE |  |  | 0 | 1 |
|   | 2 | 1 | D2 | TRUE | TRUE |  | 2 | 1 |
|   |   | 2 | D1 | TRUE |  | FALSE | 2 | 1 |
| 5 | 1 | 1 | D4 | TRUE | TRUE |  | 1 | 2 |
|   |   | 2 | D3 | TRUE |  |  | 1 | 2 |
|   | 2 | 1 | D1 | TRUE | FALSE |  | 3 | 1 |
|   |   | 2 | D2 | TRUE |  | FALSE | 2 | 1 |
| 6 | 1 | 1 | D3 | TRUE | FALSE |  | 2 | 2 |
|   |   | 2 | D4 | TRUE |  |  | 1 | 2 |
|   | 2 | 1 | D2 | TRUE | FALSE |  | 3 | 1 |
|   |   | 2 | D1 | TRUE |  | FALSE | 3 | 1 |
| 7 | 1 | 1 | x | FALSE | TRUE |  | 0 | 1 |
|   |   | 2 | D3 | TRUE |  |  | 2 | 2 |
|   | 2 | 1 | D4 | TRUE | TRUE |  | 2 | 1 |
|   |   | 2 | D2 | TRUE |  | TRUE | 3 | 1 |
| 8 | 1 | 1 | x | FALSE | TRUE |  | 0 | 1 |
|   |   | 2 | x | FALSE |  |  | 0 | 1 |
|   | 2 | 1 | D3 | TRUE | TRUE |  | 3 | 1 |
|   |   | 2 | D4 | TRUE |  | TRUE | 2 | 1 |
| 9 | 1 | 1 | x | FALSE | TRUE |  | 0 | 1 |
|   |   | 2 | x | FALSE |  |  | 0 | 1 |
|   | 2 | 1 | D4 | TRUE | FALSE |  | 3 | 1 |
|   |   | 2 | D3 | TRUE |  | FALSE | 3 | 1 |
| 10 | 1 | 1 | x | FALSE | TRUE |  | 0 | 0 |
|   |   | 2 | x | FALSE |  |  | 0 | 1 |
|   | 2 | 1 | x | FALSE | TRUE |  | 0 | 0 |
|   |   | 2 | D4 | TRUE |  | TRUE | 3 | 1 |
| 11 | 1 | 1 | x | FALSE | TRUE |  | 0 | 0 |
|   |   | 2 | x | FALSE |  |  | 0 | 0 |
|   | 2 | 1 | x | FALSE | TRUE |  | 0 | 0 |
|   |   | 2 | x | FALSE |  | TRUE | 0 | 0 |
| 12 | 1 | 1 | x | FALSE | TRUE |  | 0 | 0 |
|   |   | 2 | x | FALSE |  |  | 0 | 0 |
|   | 2 | 1 | x | FALSE | TRUE |  | 0 | 0 |
|   |   | 2 | x | FALSE |  | FALSE | 0 | 0 |

FIGURE 9

DYNAMIC PROPAGATION WITH ITERATIVE PIPELINE PROCESSING

RELATED APPLICATIONS

This patent application is related to and claims priority to U.S. Provisional Patent Application No. 61/597,926, entitled "Intelligent Pipe Management Architecture with Dynamically Controlled Loops," filed on Feb. 13, 2012, which is hereby incorporated by reference in its entirety.

TECHNICAL FIELD

Aspects of the disclosure are related to the field of iterative data processing and computing systems, and in particular, data processing using dynamically controlled pipeline architectures in data processing devices.

TECHNICAL BACKGROUND

Processing of data in processing systems and processing devices can be handled by various architectures and algorithms. Some data processing algorithms include iterative processing, which process a piece of data one or more times, such as in encryption, signal processing, hashing, or other data processing techniques. However, it can be difficult to achieve high throughput in data processing devices with limited logic resources when employing iterative algorithms.

Various techniques have been developed to enhance performance of iterative algorithms implemented on data processing devices, such as conventional single-stage iterative processing, serial pipeline processing, and parallel processing. However, each of these techniques includes shortcomings which limit throughput and hinder implementation on small logic devices. For example, iterative algorithms can be implemented in many parallel logic blocks to process data simultaneously to enable faster data processing throughput. However, in logic devices, the inclusion of many processing blocks in parallel can lead to high fan-out problems or require a large communication bus to distribute/collect data to/from the many parallel data processing blocks. Conventional serial pipeline techniques, which unroll an iterative loop partially or entirely, can also help to increase throughput, but at the expense of large amounts of serial logic which can consume scarce logic resources of a logic device.

OVERVIEW

Systems, apparatuses, methods, and software for processing data in pipeline architectures are provided herein. In one example, a pipeline architecture is presented. The pipeline architecture includes a plurality of processing stages, linked in series, that iteratively process data as the data propagates through the plurality of processing stages. The pipeline architecture includes at least one other processing stage linked in series with and preceded by the plurality of processing stages and configured to iteratively process the data a number of times based at least on an iteration count comprising how many times the data was iteratively processed as the data propagated through the plurality of processing stages.

In another example, an apparatus is provided. The apparatus includes a plurality of processing stages, linked in series, that iteratively process data as the data propagates through the plurality of processing stages, and at least one other processing stage linked in series with and preceded by the plurality of processing stages and configured to iteratively process the data a number of times based at least in part on an iteration count comprising how many times the data was iteratively processed as the data propagated through the plurality of processing stages.

In another example, a second apparatus is provided. The apparatus includes a computer readable storage media, and program instructions stored on the computer readable storage media that, when used to configure a programmable logic device, establish a pipeline architecture on the programmable logic device. The pipeline architecture includes a plurality of processing stages, linked in series, that iteratively process data as the data propagates through the plurality of processing stages, and at least one other processing stage linked in series with and preceded by the plurality of processing stages that iteratively process the data a number of times based at least in part on an iteration count comprising how many times the data was iteratively processed as the data propagated through the plurality of processing stages.

In another example, a third apparatus is provided. The apparatus includes a computer readable storage media, and program instructions stored on the computer readable storage media. The program instructions include a plurality of processing stages, linked in series, that iteratively process data as the data propagates through the plurality of processing stages, and at least one other processing stage linked in series with and preceded by the plurality of processing stages that iteratively process the data a number of times based at least in part on an iteration count comprising how many times the data was iteratively processed as the data propagated through the plurality of processing stages.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views. While several embodiments are described in connection with these drawings, the disclosure is not limited to the embodiments disclosed herein. On the contrary, the intent is to cover all alternatives, modifications, and equivalents.

FIG. 2 is a flow diagram illustrating a method of operation of a pipeline architecture.

FIG. 3 is a flow diagram illustrating a method of operation of a pipeline architecture.

FIG. 8 is a flow diagram illustrating a method of operation of input multiplexers in a pipeline architecture.

FIG. 9 includes a transition table illustrating data and control flow of a pipeline architecture.

DETAILED DESCRIPTION

Pipeline architectures can include many identical processing stages linked in series for processing data sequentially as the data propagates down through a pipeline. However, in the examples discussed herein, each processing stage of the pipeline architecture includes looping features which are controlled dynamically as data propagates through each stage of the pipeline architecture. The high fan-out and large logic real estate limitations of conventional parallel and serial data processing techniques can be avoided.

Figure 1:
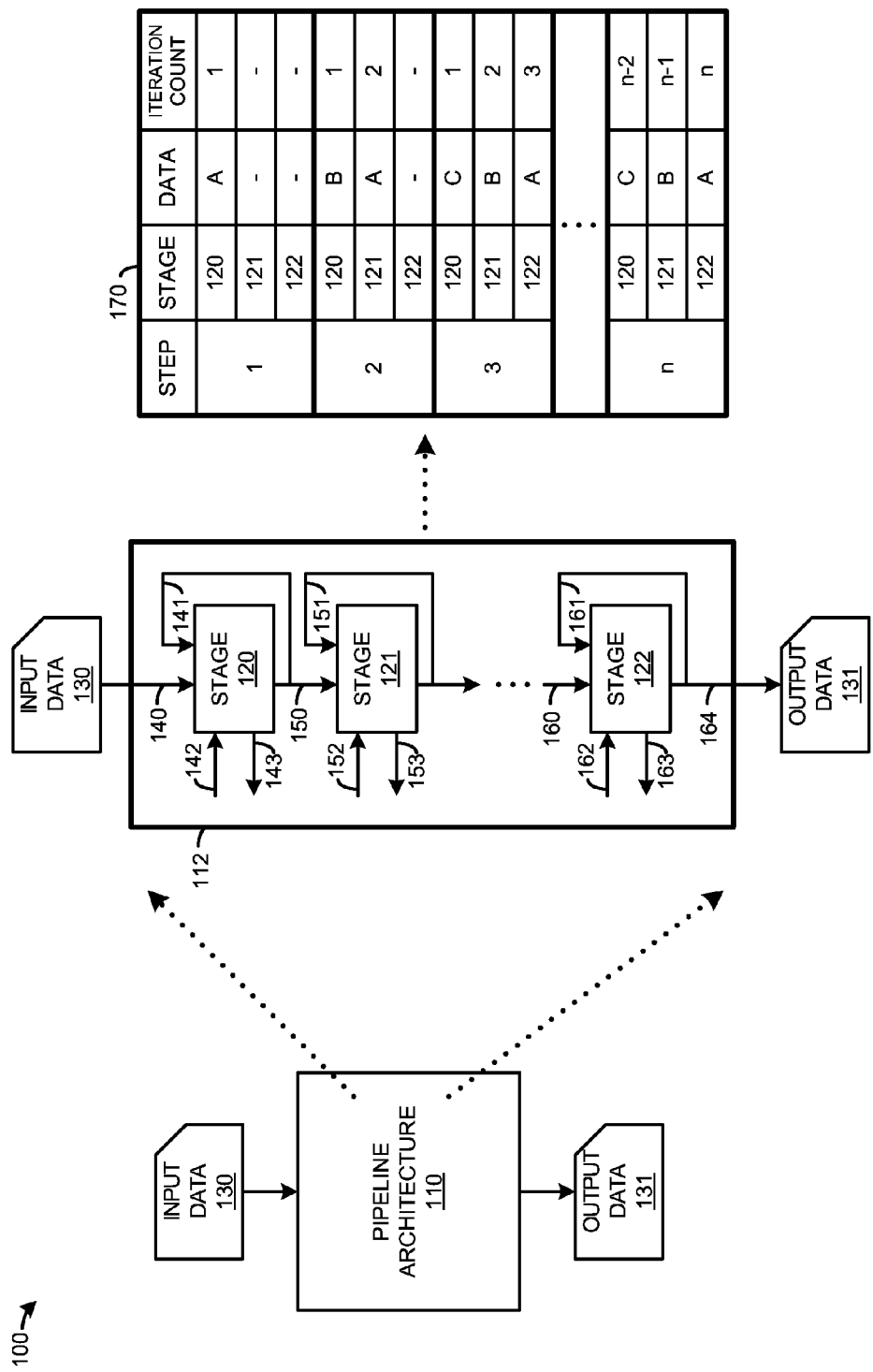
FIG. 1 is a system diagram illustrating a pipeline processing system.

As a first example employing a pipeline architecture, FIG. 1 is presented. FIG. 1 is a system diagram illustrating pipeline processing system 100. Pipeline processing system 100 includes pipeline architecture 110, input data 130, and output data 131. A detailed view 112 of example features of pipeline architecture 110 is also included in FIG. 1. Pipeline architecture 110 includes one or more processing stages 120-122. A first processing stage 120 receives input data 130 over link 140. A final processing stage 122 transfers output data 131 over link 164. Processing stages 120 and 121 transfer data to a subsequent processing stage over associated links 150 and 160. Processing stages 120-122 can feedback data for iterative processing using associated ones of links 141, 151, and 161.

To further illustrate FIG. 1, a brief description of the operation of pipeline architecture 110 is included. In operation, new data to be processed by pipeline architecture is introduced into processing stage 120, and the data is processed by and propagates through each of processing stages 120-122. Propagation of data to a subsequent processing stage from a current processing stage is determined in part by the state of at least one subsequent processing stage. When no subsequent processing stages are left, such as in a final processing stage, propagation of the data out of pipeline architecture 110 is determined in part by the number of times that the data has been processed. The flow of data through pipeline architecture is thus in part controlled by the state of data processing in processing stage 122 as well as the state of processing stages 120-121. The state of processing stage 122 can be indicated by an iteration count associated with the data being processed in processing stage 122, and the state of processing stages 120-121 can be indicated by a thread count or max capacity indicator. A further discussion of various indicators and states are found below.

In some examples, processing stage 122 determines a state and passes an indicator related to this state to processing stages 120 and 121 over link 163 which can be received over links 142 and 152. Additional logic or processing can be included in link 163 before routing the indicator over links 142 and 152. In other examples, a monitoring stage is employed to monitor the state of processing stage 122, and the monitoring stage passes the indicator related to this state to processing stages 120 and 121 over links 142 and 152. In yet other examples, each processing stage has an associated monitoring stage.

FIG. 2 illustrates a flow diagram which describes an example method of operation of a pipeline processing system, such as for pipeline processing system 100 or pipeline architecture 110 of FIG. 1. The operations of FIG. 2 are referenced parenthetically in the description below.

In FIG. 2, pipeline processing system 100 iteratively processes (201) data as the data propagates through a plurality of processing stages linked in series. Input data 130 is introduced to pipeline architecture 110 in FIG. 1 over link 140 into processing stage 120. Processing stage 120 processes input data 130 a number of iterative times based in part on the state of one or more subsequent processing stages of pipeline architecture 110. As the data propagates through pipeline architecture 110, the data continues to be processed by ones of processing stages 120 and 121. The propagation can occur based on a clock cycle or periodic processing period by which logic or buffer portions of each processing stage can responsively pass data to a subsequent processing stage, receive data from a preceding processing stage, or loop/feedback data to the same processing stage.

In a further processing stage preceded by the plurality of processing stages, pipeline processing system 100 iteratively processes (202) the data a number of times based on an iteration count. Typically, when the data has been processed a number of times which reaches the iteration count, then the data is output as output data 131 by a final processing stage, namely processing stage 122 in this example.

As one example of data processing in pipeline architecture, table 170 is shown in FIG. 1. A first column of table 170 indicates a step number which can relate to a clock cycle, operational phase, and the like. Each step indicates a different stage or snapshot of the state of data processing within pipeline architecture 110. A second column indicates each processing stage 120-122, with associated rows indicating the data presently being processed by a particular processing stage and an iteration count associated with the data.

In step 1 of table 170, data 'A' is introduced to stage 120 for processing and the iteration count of 1 indicates that data 'A' is within the first processing iteration. In this example, pipeline architecture 110 is initially empty of data, and thus in step 1 of table 170 no data is found in processing stages 121 and 122. In step 2 of table 170, data 'A' has propagated into processing stage 121 for a second iteration of processing indicated by an iteration count of 2. New data 'B' has been introduced into processing stage 120 for a first iteration of processing. Processing stage 122 still lacks any data. In step 3 of table 170, data 'A' has propagated into processing stage 122 for a third iteration of processing indicated by an iteration count of 3. Data 'B' has propagated into processing stage 121 for a second iteration of processing indicated by an iteration count of 2. New data 'C' has been introduced into processing stage 120 for a first iteration of processing. At step 3 of table 170, the example pipeline architecture is considered 'full' and thus no new data is introduced into processing stage 120 in further steps until data is output as output data 131.

The iteration count can be associated with an iteration count threshold or a maximum iteration count, and the like, which can indicate how many times a particular piece or portion of data is to be processed iteratively by pipeline architecture 110. In table 170, an example maximum iteration count of 'n' is used. For example, if 'n' is 5, then once data 'A' reaches processing stage 122 with an iteration count of 3, then two additional processing iterations are performed in processing stage 122 on data 'A' before being output as output data 131. Data 'B' and data 'C' remain iteratively processed by processing stages 121 and 120, respectively, until data 'A' has reached the maximum iteration count. Once data 'A' has finished iterative processing in processing stage 122, then data 'A' is output as output data 131 and data in the preceding processing stages 120-121 is propagated down pipeline architecture 110. Thus, data 'B' is processed by processing stage 122 until the maximum iteration count is reached, data 'C' is processed by processing stage 121, and new input data 130 can be introduced into processing stage 120. Propagation and processing continue in this manner until no more input data is introduced and all previous data has completed processing.

In FIG. 1, only three processing stages 120-122 are included in pipeline architecture 110 for clarity, but any number of processing stages can be included in other examples. New data will propagate through each processing stage until all subsequent processing stages are 'full' and already processing existing data. Then the new data is iteratively processed by a present processing stage until instructed to propagate the new data to a next processing stage. Thus, processing of data can be iterated by a given processing stage a dynamic or variable number of times based on the state of at least one subsequent processing stage. While data is being iteratively processed by a given processing stage, the data is looped back or fed back as input data to that given processing stage until the data is propagated to a subsequent stage. Feedback links 141, 151, and 161 illustrate this looping of data back to the input of a particular processing stage. Logic of each processing stage determines if input data is to be received from a preceding processing stage or from an associated feedback link.

Propagation control or signaling can be indicated to processing stage 120 over link 142, processing stage 121 over link 152, and processing stage 122 over link 162. In some examples, such as that shown in FIG. 1, a final processing stage such as processing stage 122 outputs a control signal 163 which indicates to processing stages 120 and 121 that data is exiting pipeline architecture 110. This can be due to data presently being processed in processing stage 122 reaching the maximum iteration count, although other considerations are possible. Additional logic can be included in links 142, 152, and 162 to control, alter, or otherwise propagate the control signals to the various processing stages. In further examples, a control logic portion separate from the processing stages is employed to monitor the operation of the processing stages and determine a control signal for propagating data between the processing stages.

FIG. 3 illustrates a flow diagram which describes another example method of operation of a pipeline processing system, such as for pipeline processing system 100 or pipeline architecture 110 of FIG. 1. The operations of FIG. 3 are referenced parenthetically in the description below.

In FIG. 3, data is input (301) to a processing pipeline, namely input data 130 introduced into stage 120 of pipeline architecture 110. Pipeline architecture 110 processes (302) the data at each processing stage as the data propagates through a plurality of processing stages 120-122 linked in series. As described above for FIG. 2, as data propagates through each processing stage, the data is processed by ones of processing stages 120-122, with iterative looping or feedback at each processing stage controlled at least by associated links 142, 152, and 162. If every processing stage 120-122 is presently processing data, then no further input data 130 is introduced into pipeline architecture 110. If for example, processing stage 120 is not presently processing data, then new data can be introduced into processing stage 120. It should be understood that each portion of the data being processed by a particular processing stage can be sub-portions of a larger data set or can be separate unrelated data portions.

When an iteration count of the data being processed by a final processing stage has not yet reached (303) an iteration threshold at that final processing stage, then the data is continued to be iteratively processed in associated ones of the processing stages as well as the final processing stage. In this example, the final processing stage is processing stage 122. Data presently being processed by the individual processing stages is looped or fed back for iterative processing at the associated processing stage over associated ones of links 141, 151, and 161.

When the iteration count of the data has reached (303) an iteration threshold at a final processing stage, then processing has completed (304) for the data being processed by the final processing stage. The data which has finished iterative processing in processing stage 122 is transferred as output data 131. Responsive to processing stage 122 reaching the iteration threshold for the data, each processing stage in pipeline architecture is instructed to receive new data from a preceding processing stage or from an external source for processing instead of iterating the present data. Specifically, processing stage 122 receives data over link 160 from a preceding processing stage, processing stage 121 receives data over link 150 from processing stage 120, and processing stage 120 receives input data 130 over link 140. Thus, data is propagated over links 140, 150, and 160 for processing by a respective processing stage instead of the feedback links 141, 151, and 161.

Referring back to the elements of FIG. 1, input data 130 comprises data to be processed by pipeline architecture 110. Input data 130 can include data of any bit width for processing in an iterative algorithm, such as data for encryption, decryption, hash functions, digital signal processing, Fast Fourier Transform (FFT) operations, or other data operations including combinations, variations, and improvements thereof. Output data 131 comprises data which has been processed by pipeline architecture 110.

Pipeline architecture 110 comprises one or more processing stages 120-122 for processing data according to the description herein. Pipeline architecture 110 can comprise logic, logic gates, programmable logic, combinatorial logic, sequential logic, signal link, transmission circuitry, and can be included on a field programmable gate array (FPGA), an application specific integrated circuit (ASIC), or microprocessor. Pipeline architecture 110 can comprise read-only memory (ROM) instructions, firmware, software instructions, machine code, source code, or other computer-readable instructions which when executed by a processing device or logic device can perform the operations described herein. In some examples, the instructions are stored on a computer readable storage medium, such as a solid state storage array, flash memory, static random-access memory (SRAM), magnetic memory, phase change memory, non-transitory computer readable memory, or combinations and variations thereof.

Links 140-143, 150-153, and 160-164 can each use various communication media, such as air, space, metal, semiconductor, optical fiber, software, firmware, or some other signal propagation path, including combinations thereof. Links 140-143, 150-153, and 160-164 could each be a direct link or might include various logic, intermediate components, systems, and networks. Links 140-143, 150-153, and 160-164 could each be a shared link, aggregated link, or may be comprised of discrete, separate links. Links 140-142, 150-152, and 160-164 can comprise signal lines, semiconductor interconnect, metal interconnect, printed circuit traces, flexible printed circuits, or discrete wires, including combinations or variations thereof. If multiple printed circuit boards are employed, inter-board connectors or cabling are employed to communicatively couple each printed circuit board.

Figure 4:
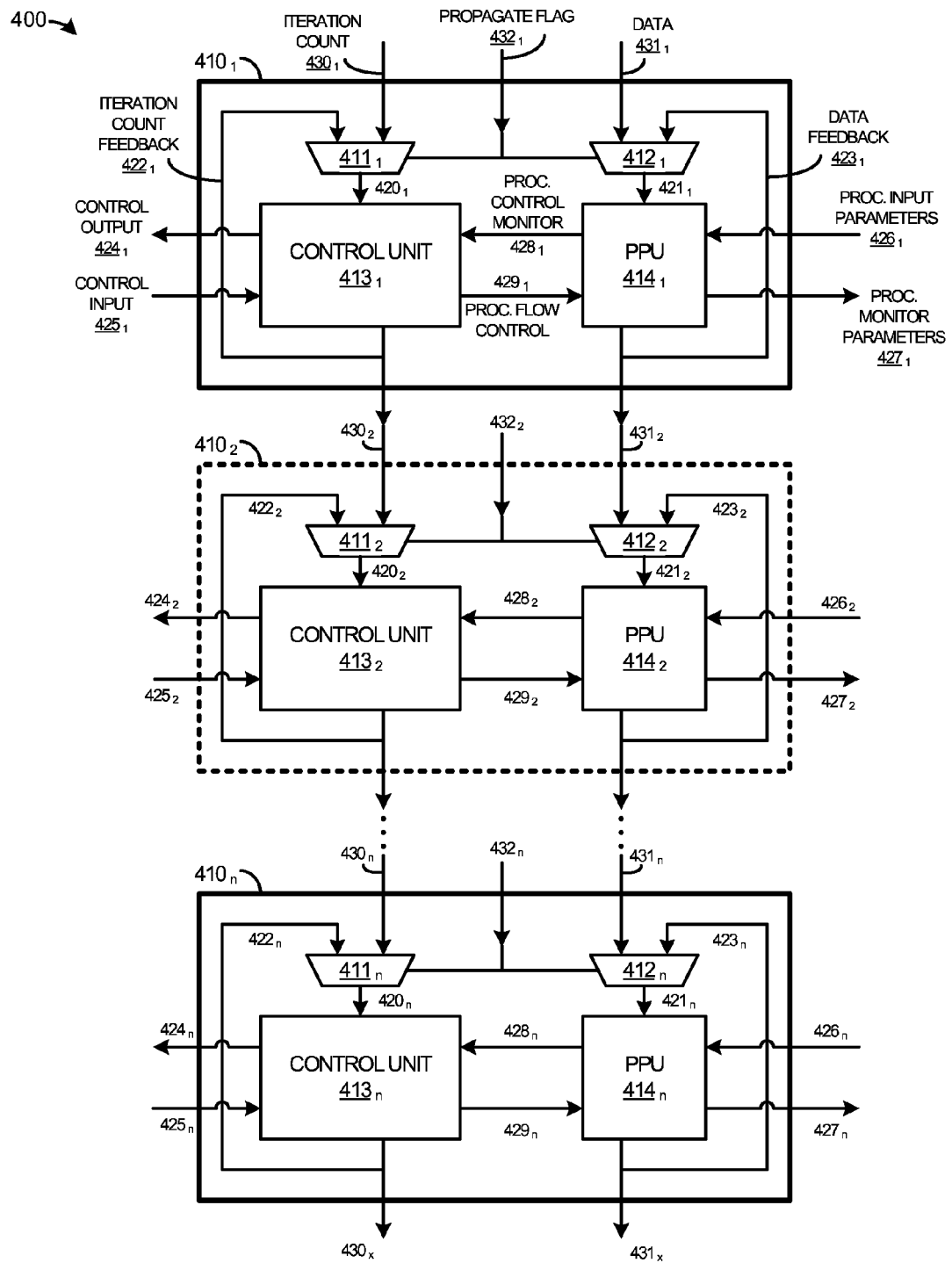
FIG. 4 is a system diagram illustrating a pipeline architecture.

FIG. 4 is a system diagram illustrating pipeline architecture 400. Pipeline architecture 400 is an example of elements of pipeline architecture 100 of FIG. 1, although pipeline architecture 100 can use different configurations. Pipeline architecture 400 includes three processing stages in this example, namely processing stages $410_1$-$410_n$, although it should be understood that any number of processing stages can be included.

Pipeline architecture 400 can be implemented using application specific integrated circuit (ASICs), gate arrays, field-programmable gate arrays (FPGAs), logic devices, processing systems, microprocessors, and the like. Pipeline architecture 400 can also be implemented in source code or binary code and stored on a computer-readable storage medium.

Pipeline architecture 400 can implement algorithms that are iterative in nature, such as block ciphers, hash functions, and the like. In operation, data and iteration counts are propagated and processed by each processing stage $410_{1-n}$ and propagated between adjacent processing stages, with looping or feedback of data at each processing stage $410_{1-n}$ controlled at least by links $432_{1-n}$. An iteration count and associated data can be output after final processing stage $410_n$ over links $430_x$ and $431_x$. First processing stage $410_1$ receives an iteration count over link $420_1$ and data over link $421_1$, which can be received from an input source or processing stage $410_1$ itself. Processing stage $410_2$ receives an iteration count over link $420_2$ and data over link $421_2$ from a preceding processing stage $410_k$ or processing stage $410_2$ itself. Processing stage $410_n$ receives an iteration count over link $420_n$ and data over link $421_n$ from a preceding processing stage or processing stage $410_n$ itself. The preceding processing stage for processing stage $410_n$ can include a preceding processing stage not included in FIG. 4, or can include processing stage $410_2$.

Each processing stage $410_1$-$410_n$ includes four elements in FIG. 4, namely an associated control multiplexer $411_{1-n}$, data multiplexer $412_{1-n}$, control unit $413_{1-n}$, and pipeline processing unit $414_{1-n}$. Additional logic can be included for modifying, controlling, inverting, buffering, or otherwise distributing propagation control signals $424_{1-n}$ to other ones of the processing stages. Control signals $424_{1-n}$ can be received by ones of the processing stages over associated control input links $432_{1-n}$, and $425_{1-n}$.

Figure 5:
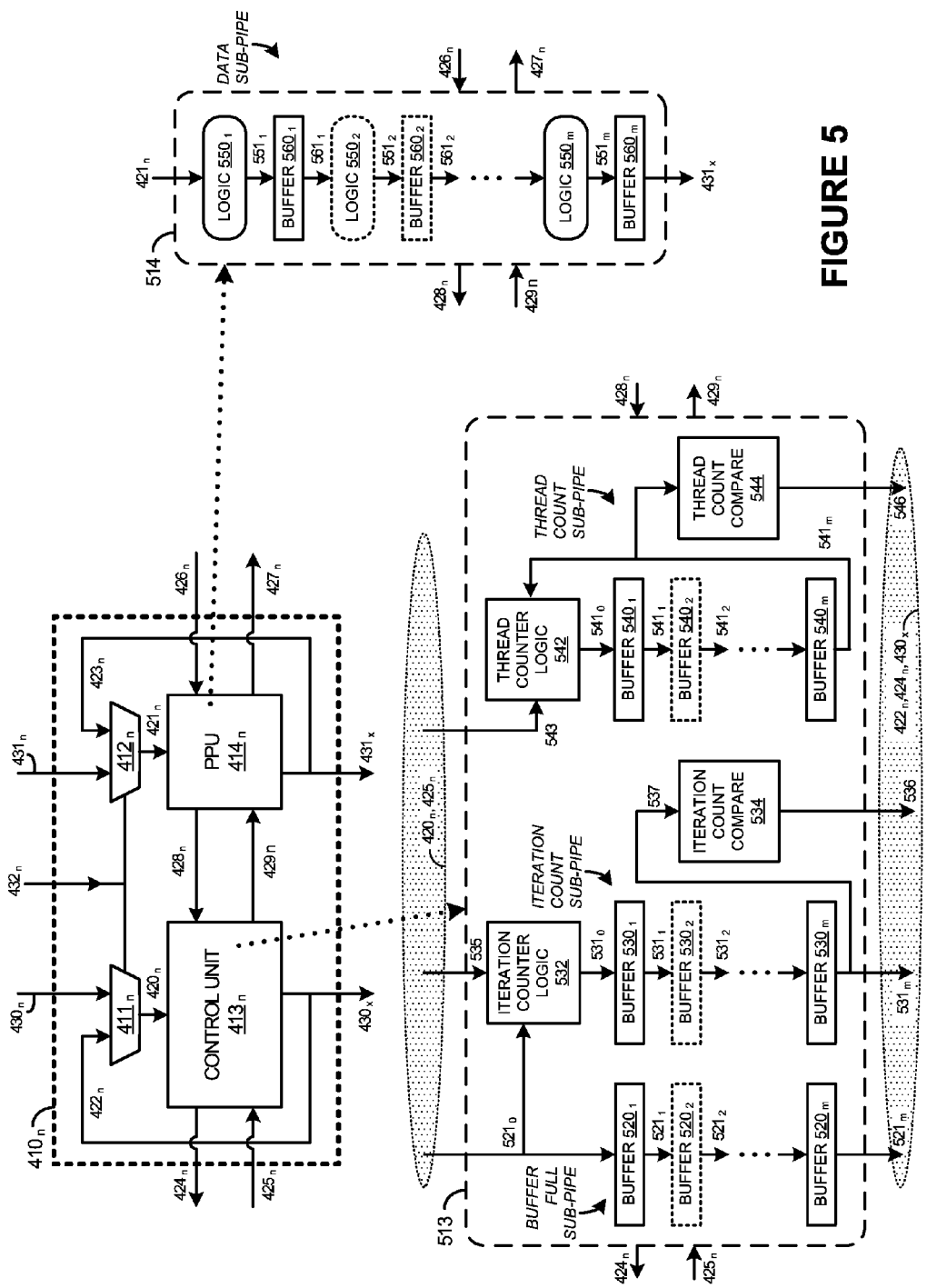
FIG. 5 is a block diagram illustrating a pipeline processing stage.

Control units $413_{1-n}$ and pipeline processing units (PPU) $414_{1-n}$ each can include one or more sub-pipeline stages, as detailed further in the examples of FIG. 5. Multiplexers $411_{1-n}$ and $412_{1-n}$, control units $413_{1-n}$, and pipeline processing units $414_{1-n}$ each can include logic, data buffers, processing systems, links, or other data processing elements, including combinations and variations thereof.

Data links $423_{1-n}$ and $431_{1-n}$ designate a plurality of signals that feed the associated pipeline processing unit $414_{1-n}$. Multiplexers $412_{1-n}$ each control which of links $423_{1-n}$ and $431_{1-n}$ is routed to the associated pipeline processing unit $413_{1-n}$ over link $421_{1-n}$ based on at least link $432_{1-n}$. For example, when link $432_{1-n}$ is a '0' then data feedback links $423_{1-n}$ are routed to link $421_{1-n}$ and when link $432_{1-n}$ is a '1' then data input links $431_{1-n}$ are routed to link $421_{1-n}$. It should be understood that other bit or polarity configurations are possible for links $432_{1-n}$.

Control links $422_{1-n}$, and $430_{1-n}$ designate a plurality of signals that feed the associated control unit $413_{1-n}$. Multiplexers $411_{1-n}$ each control which of links $422_{1-n}$ and $430_{1-n}$ is routed to the associated control unit $413_{1-n}$ over link $420_{1-n}$ based on at least link $432_{1-n}$. For example, when link $432_{1-n}$ is a '0' then feedback links $422_{1-n}$ are routed to link $420_{1-n}$ and when link $432_{1-n}$ is a '1' then input links $430_{1-n}$ are routed to link $420_{1-n}$. It should be understood that other bit or polarity configurations are possible for links $432_{1-n}$. In this example, control links $422_{1-n}$ are iteration count feedback links, and control links $430_{1-n}$ are iteration count input links.

Control output links $424_1$, can include signals that help determine signals that feed associated links $432_{1-n}$, a value of a propagate flag, signals that assist control units in other processing stages, or signals that feed into additional logic, among other signals. Control input signals $425_{1-n}$ can include signals from other control units in other processing stages, such as link $424_n$, or from external logic for affecting the operation of control units $413_{1-n}$. In some examples, such as in advanced encryption standard (AES) processing, where each processing stage $410_{1-n}$ implements a single AES block cipher round, links $424_{1-n}$ can each be used to return the round number (such as the iteration number) for the current data in a sub-pipeline stage. These round numbers can be fed into an external RAM which returns the correct round keys through links $426_{1-n}$.

Processing control monitor links $428_{1-n}$ include signals exiting the associated pipeline processing units $414_{1-n}$ and entering the associated control units $413_{1-n}$. Links $428_{1-n}$ can include signals testing or monitoring various conditions of sub-pipeline stages of pipeline processing units $414_{1-n}$ for assisting in the operation of control units $413_{1-n}$. Processing flow control links $429_{1-n}$ include signals exiting the associated control units $413_{1-n}$ and entering the associated pipeline processing units $414_{1-n}$. Links $429_{1-n}$ can include signals that feed control variables to sub-pipeline stages of pipeline processing units $414_{1-n}$. In one example, where pipeline processing units $414_{1-n}$ each implement a single AES round, links $429_{1-n}$ can be used to return a final iteration signal indicating to pipeline processing units $414_{1-n}$ that the current data in a sub-pipeline stage has reached a final round and should skip the mix column operations. In other examples, links $429_{1-n}$ can include signals that shut off sub-pipeline stages that are currently not in use, such as in dynamic power consumption control processes.

Processing input parameter links $426_{1-n}$ and processing monitor parameter links $427_{1-n}$ can each include signals to/from external logic that feed data to sub-pipeline stages of pipeline processing units $414_{1-n}$. In one example, each pipeline processing unit $414_{1-n}$ can implement a single AES block cipher round with links $426_{1-n}$ feeding the associated pipeline processing unit $414_{1-n}$ with round keys. Links $427_{1-n}$ can include signals testing various conditions of the sub-pipeline stages or data from the sub-pipelines themselves. For example, pipeline processing unit $414_{1-n}$ can implement a single round of the cryptographic hash SHA-1 that tests for near-collisions on a pair of messages, and links $427_{1-n}$ can each signal when near-collisions have been found and indicate the block of data over which the collision took place.

As mentioned above, pipeline architecture 400 advantageously can implement algorithms that are iterative in nature, such as block ciphers, hash functions, and the like. In one example, an AES block cipher implementation with a single iterative loop looping over one round can be arranged into 8 independent parallel implementations with a single input line and a shared output bus. This implementation would increase the maximum theoretical throughput by a factor of 8. However, similar performance increase can be found using pipeline architecture 400 and n=8 and assigning each pipeline processing unit $414_{1-n}$ to compute a single AES round. The independent parallel implementation mentioned above suffers from a large input fan-out feeding each of the AES parallel implementations and a bus to control data output. This fan-out and bus can affect the maximum clock rate and power consumption of the system. Advantageously, pipeline architecture 400 requires no fan-out or bus, thus allowing for potentially faster maximum clock rate and lower power consumption.

FIG. 5 is a block diagram illustrating elements of pipeline architecture 400, namely pipeline processing stage $410_n$, as an example of any of processing stages $410_{1-n}$ of FIG. 4, although processing stages $410_{1-n}$ can use other configurations. FIG. 5 illustrates an example configuration of control unit $413_n$ as control unit 513, and an example configuration of pipeline processing unit (PPU) $414_n$ as PPU 514. In this example, sub-pipeline processing stages 1-m are shown for each control unit 513 and PPU 514. Typically, each control unit 513 and PPU 514 include the same number of sub-pipeline stages or ranks, so that 'm' is similar for both control unit 513 and PPU 514. Control unit $413_n$ includes three sub-pipelines in this example, namely a buffer full sub-pipeline comprising buffers $520_1$-$520_m$, an iteration count sub-pipeline comprising buffers $530_1$-$530_m$, and a thread count sub-pipeline comprising buffers $540_1$-$540_m$. PPU 514 includes one sub-pipeline in this example, namely data sub-pipe comprising logic $550_1$-$550_m$ and buffers $560_1$-$560_m$.

The various buffers, logic, and links of control unit 513 and PPU 514 can use various combinatorial and sequential logic elements, such as discrete logic, integrated circuitry, flip flops, logic gates, interconnect, and the like. Typically, each buffer portion comprises one or more flip flops or other sequential logic elements, controlled by a clocking mechanism, such as a common or distributed clock signal for pipeline architecture 400.

Looking first at PPU 514, one or more sub-pipeline stages are linked in series, with each sub-pipeline stage comprising a logic portion 550 and a buffer portion 560 linked by associated links 551. Links 561 interconnect each sub-pipeline stage. Each logic portion $550_{1-m}$ comprises a pre-determined function designated by the algorithm and input, and can be different for each of logic portions $550_{1-m}$. When data has propagated through a logic portion 550, the new value of the data is stored in the associated buffer 560. A clock signal can control the propagation of data from buffer portion to buffer portion, allotting enough time in between clocking periods for the associated logic portion to perform any logical operations on the associated data.

Looking next at control unit 513, input signals $420_n$ and $425_n$ can include any control related signals introduced into control unit 513, including iteration counts, buffer fullness status, and the like. In this example, input signals $420_n$ and $425_n$ include buffer full status input link $521_0$, iteration count input link 535, and thread count input link 543. Also in this example, output signals $422_n$, $424_n$, $430_k$ include buffer full status output link $521_m$, iteration count output link $531_m$, data propagation flag link 536, and maximum capacity flag link 546.

The buffer full sub-pipeline comprises buffers $520_1$-$520_m$. A buffer full status is introduced into control unit 513 over link $521_0$ and propagated through a series of buffers $520_{1-m}$ over links $521_{1-m}$. In this example, the buffer full status for each rank of buffer $520_{1-m}$ corresponds to an equal rank of sub-pipeline stages $560_{1-m}$ in PPU 514 to indicate if that particular sub-pipeline stage is currently handling or processing data. For example, the buffer full status of buffer $520_2$ can correspond to buffer $560_2$ or logic $550_2$ of PPU 514, indicating if data is presently being processed or otherwise handled by the respective sub-pipeline stage such as by a 'true' or 'false' indication. The first rank of buffers $520_{1-m}$ (such as buffer $520_1$) is set through line $420_n$ when new data is loaded into PPU 514 or processing stage $410_n$.

The iteration count sub-pipeline comprises buffers $530_1$-$530_m$. Iteration counter logic 532 updates an iteration count value based on an iteration count signal received over link 535. A further discussion of the iteration count signal is included in the discussion for FIG. 6. It should be noted that iteration counter logic 532 need not be positioned at the top of the ranks of the iteration count sub-pipeline as pictured in FIG. 5. Instead, iteration counter logic 532 can be located at any sub-pipeline stage of the iteration count sub-pipeline or the associated computation split between one or more sub-pipeline stages.

The iteration counter is responsible for tracking the current iteration of a data thread propagating through the data sub-pipeline of PPU 514. The iteration counter is initially set through link $420_n$ when new data is loaded into PPU 514. In this example, the iteration counter is initialized to '0' for each new data thread loaded into pipeline architecture 400. In other example, different initial values can be used, and this value can be variable for each new data thread. For example, a variable initial iteration count can be employed when pipeline architecture 400 does not need to compute a full set of iterations for a particular algorithm, when a particular iteration only requires a partial computation, or when a particular iteration is desired multiple times while other iterations are desired only once. The iteration counter can be represented by an integer value or a multi-dimensional value depending upon the number or iterative loops a particular algorithm requires. A plurality of iteration counters can be employed in multi-dimensional cases. For example, the AES block cipher has a single loop and can be represented as a single integer iteration counter, while the Fast Fourier Transform (FFT) can have both an inner and outer loop corresponding to a two-dimensional integer. Other representations of the iteration counter can be employed.

Iteration count compare logic 534 determines whether the iteration counter has reached a desired iteration counter condition, such as a final iteration count or threshold iteration count. A flag or indicator is output from iteration count compare logic 534 when the desired iteration counter condition is met. Although iteration count compare logic can be included at any sub-pipeline stage $530_{1-m}$, in this example, iteration count compare logic 534 is only included at the final sub-pipeline stage $530_m$.

The thread count sub-pipeline comprises buffers $540_1$-$540_m$. Thread counter logic 542 updates a thread count value based on links 543 and $541_m$. A further discussion of the thread count signal is included in the discussion for FIG. 7. It should be noted that thread counter logic 542 need not be positioned at the top of the ranks of the thread count sub-pipeline as pictured in FIG. 5. Instead, thread counter logic 542 can be located at any sub-pipeline stage of the thread count sub-pipeline or the associated computation split between one or more sub-pipeline stages.

The term 'thread' is used to refer to the data contained in associated buffer portions $560_{1-m}$ of PPU 514. For the example found in FIGS. 4 and 5, with 'n' processing stages in pipeline architecture 400 and 'm' sub-pipelines for each processing stage in FIG. 5, there are a total of n*m unique threads. Each thread corresponds to a unique piece of data in a corresponding buffer portion, with n*m total portions of data. Thus, in some examples, a 'thread' can actually refer to a portion of data.

The thread counter for each control unit $413_{1-n}$ determines the number of times a new thread or data portion has entered the corresponding PPU $414_{1-n}$ and is still being processed within pipeline architecture 400. The data propagation of each thread in architecture 400 of a PPU is influenced by the other threads at the same sub-pipeline stage in the other PPUs. Thread count compare logic 544 determines whether the thread counter received over link $541_m$ has reached a desired thread counter condition, such as a maximum thread count. The thread counter can resemble a turnstile, where when new data portions enter a PPU the turnstile counter increases by one until a maximum capacity is reached corresponding to the total number of distinct PPUs (including the current PPU) a data thread has to enter before exiting architecture 400 (e.g. PPU $414_n$ has a maximum capacity of 1 while PPU $414_2$ has a maximum capacity of n−1). Each sub-pipeline stage keeps track of a thread counter which circulates through buffers $540_{1-m}$. Once the maximum capacity for a PPU is reached at a given thread, then new data portions are prevented from entering that PPU at that thread position. When a data portion exits pipeline architecture 400, the thread counter decreases by one and a new data portion is allowed to enter the PPU at that thread position. Thread count compare logic 544 can be located at a different sub-pipeline stage and have a buffered output.

Using the above description of control unit $413_n$ and PPU $414_n$ and applied to processing stages $410_{1-n}$ of pipeline architecture 400, a more general operation can be described. The operation of a single processing stage $410_n$ can thus be representative of an entire pipeline architecture employing one or more processing stages. For example, assuming an initially empty pipeline, when a data portion first enters pipeline architecture 400, the data portion is introduced into a first processing stage $410_1$. The data portion continues through each subsequent processing stage $410_{2-n}$ until a final processing stage, such as processing stage $410_n$. If the data portion has not been iteratively processed enough times to reach the iteration condition, such as the iteration threshold, then the data portion continues to loop through the final processing stage until the iteration condition is reached. As new data portions enter processing architecture 400, these data portions propagate down through and are processed by the processing stages toward the final processing stage. When these new data portions reach the last empty processing stage these new portions then each iterate by looping through the associated processing stages until the thread counter indicates that space is available in a subsequent sub-pipeline. When a data portion or thread exits the final processing stage then all preceding data or threads propagates downward through the sub-pipelines and processing stages.

Figure 6:
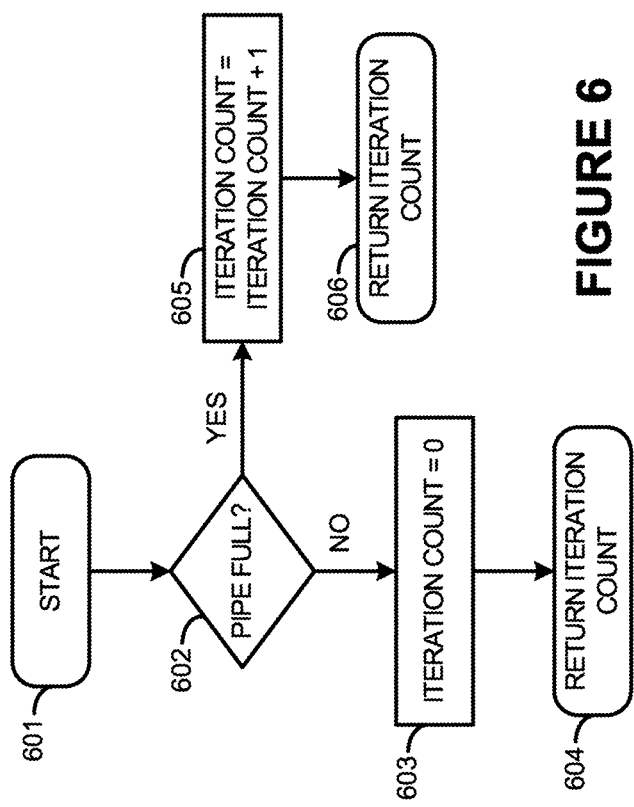
FIG. 6 is a flow diagram illustrating a method of operation of an iteration counter in a pipeline architecture.

FIG. 6 is a flow diagram illustrating a method of operation of an iteration counter in a pipeline architecture, such as iteration counter logic 532 of FIG. 5. The operations of FIG. 6 are referenced below parenthetically. In FIG. 6, the operations can describe an iteration counter or iteration count logic of a processing stage, such as found in control units $413_{1-n}$ of processing stages $410_{1-n}$ of FIG. 4.

Iteration counter logic 532 has two input links, namely links $521_0$ and 535, and one output link $531_0$. Link $521_0$ indicates a 'pipe full' status and iteration counter logic 532 tests (602) if the 'pipe full' status is true or false. If true, iteration counter logic 532 determines a new iteration counter value by increasing (605) the iteration counter by one, and outputs (606) the new iteration counter value over link $531_0$. If false, iteration counter logic 532 determines (603) the iteration counter as '0' or another initial value and outputs (604) the iteration counter value over link $531_0$. It should be understood that the process of iteration counter logic 532 increasing the iteration counter by one can vary depending upon the form of the iteration counter. For example, when an integer is used to represent the iteration counter, then adding a value of '1' to the current iteration counter is sufficient. However, when a two-dimensional integer is used for the iteration counter, then iteration counter logic 532 can increase the inner and/or outer loop counts accordingly.

Figure 7:
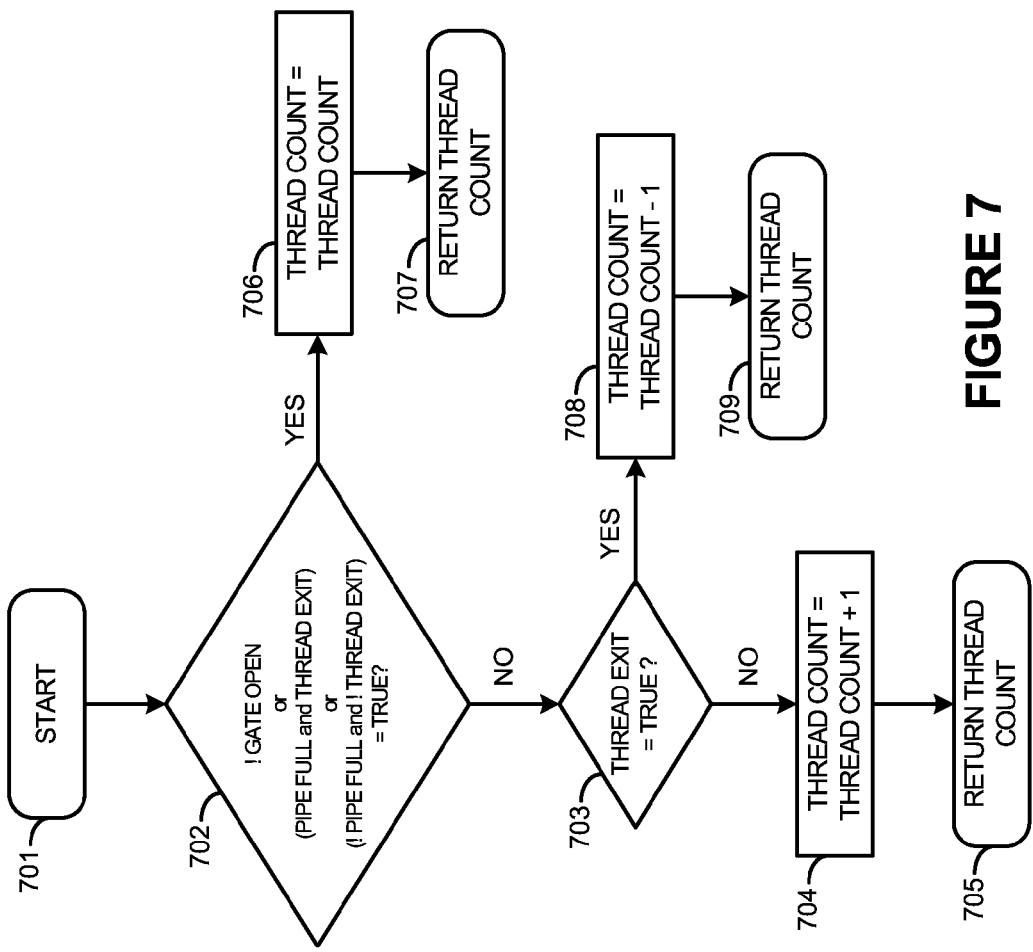
FIG. 7 is a flow diagram illustrating a method of operation of a thread counter in a pipeline architecture.

FIG. 7 is a flow diagram illustrating a method of operation of a thread counter in a pipeline architecture, such as thread counter logic 542 of FIG. 5. The operations of FIG. 7 are referenced below parenthetically. In FIG. 7, the operations can describe a thread counter or thread count logic of a processing stage, such as found in control units $413_{1-n}$ of processing stages $410_{1-n}$ of FIG. 4. It should be understood that the 'or' 'and' and '!' designators in FIG. 7 indicate logical operators, where '!' represents a false condition.

Thread counter logic 542 has two input links, namely links 543 and $541_m$, and one output link $541_0$. Link 543 can represent a composite link which for processing stage $410_n$, can include links $521_0$, $432_n$, and 536. In this example, link $521_0$ represents a 'pipe full' status, link $432_n$ represents a 'gate open' status, and link 536 represents a 'thread exit' status, although other designations and statuses can be used. Also in this example, 'gate open' status is true when link $432_n$ is a '1' value and false when $432_n$ is '0' value.

Thread counter logic 542 begins (701) the decision process of FIG. 7 and determines (702) when 'gate open' status is false or the 'pipe full' and 'thread exit' statuses are both true or when the 'pipe full' and 'thread exit' statuses are both false. When operation 702 is true, then thread counter logic 542 determines (706) the thread counter value $541_m$ should remain unchanged and outputs (707) the unchanged thread counter value over link $541_0$. When operation 702 is false, then a further conditional check (703) is performed by thread counter logic 542. When the 'thread exit' status is true, thread counter logic 542 decrements (708) the thread counter value by one and outputs (709) the decremented thread counter value over link $541_0$. When the 'thread exit' status is false, thread counter logic 542 increments (704) the thread counter value by one and outputs (705) the incremented thread counter value over link $541_0$.

FIG. 8 is a flow diagram illustrating a method of operation of input multiplexers in a pipeline architecture, such as multiplexers $411_{1-n}$ and $412_{1-n}$ of FIG. 4. In some examples, the operations of FIG. 8 describe the operation of logic which controls multiplexers $411_{1-n}$ and $412_{1-n}$ of FIG. 4. The operations of FIG. 8 are referenced below parenthetically. It should be understood that the 'or' 'and' and '!' designators in FIG. 7 indicate logical operators, where '!' represents a false condition.

The input signal to each of multiplexers $411_1$, and $412_{1-n}$ is shown by an associated link $432_{1-n}$ in FIG. 4. Each associated link $432_{1-n}$ is fed by link $424_{1-n}$. Logic to control each of multiplexers $411_{1-n}$ and $412_{1-n}$ can be included in control units $413_{1-n}$, distributed among the various processing stages $410_{1-n}$, or included in separate logic, including combinations thereof. In FIGS. 4 and 5, links 536 and 546 can comprise link $424_n$ which can be fed to links $432_{1-n}$. In this example, link 536 represents a 'thread exit' status, and link 546 represents a 'max capacity' status, although other designations and statuses can be used.

Pipeline architecture 400 begins (801) the decision process of FIG. 8 and determines (802) if the 'thread exit' status is true or if the 'max capacity' status is false. In this example, the 'thread exit' status is for pipeline architecture 400, such as when a data thread exits processing stage $410_n$. Also, in this example, the 'max capacity' status is for the individual processing stage, such as ones of processing stages $410_{1-n}$. When operation 802 is true for a particular processing stage, then that processing stage determines (804) a multiplexer control signal should be a '1' and outputs (804) the multiplexer control signal over the associated one of links $432_{1-n}$. Operation 804 represents when a data portion or thread exits the pipeline architecture and thus space for new data exists in the sub-pipelines of the processing stages. Current data portions can then be propagated to a subsequent sub-pipeline stage, or if at a final sub-pipeline stage then to a subsequent processing stage instead of looped. Thus, data can be received by each processing stage over the associated data link $431_{1-n}$ and routed by multiplexers $412_{1-n}$ to associated links $421_{1-n}$. Also, iteration counters are not looped in operation 804, and iteration counts are propagated. Iteration counts can be received by each processing stage over the associated link $430_{1-n}$ and routed by multiplexers $411_{1-n}$ to associated links $420_{1-n}$.

When operation 802 is false for a particular processing stage, then that processing stage determines (803) a multiplexer control signal should be a '0' and outputs (803) the multiplexer control signal over the associated one of links $432_{1-n}$. Operation 803 represents when the pipeline architecture is full at a particular sub-pipeline and no further new data can be input to that particular sub-pipeline. Current data is not propagated to a subsequent processing stage and instead is looped for iterative processing by a current processing stage. Thus, data is received over feedback links in each processing stage over the associated data link $423_{1-n}$ and routed by multiplexers $412_{1-n}$ to associated links $421_{1-n}$. Also, iteration counters are looped in operation 803. Iteration counts can be received by each processing stage over the associated feedback link $422_{1-n}$ and routed by multiplexers $411_{1-n}$ to associated links $420_{1-n}$.

FIG. 9 includes transition table 900 illustrating data and control flow of a pipeline architecture, such as pipeline architecture 110 of FIG. 1 or pipeline architecture 400 of FIG. 4. Table 900 illustrates a pipeline architecture with two processing stages. Thus, in examples using pipeline architecture 400 of FIG. 4, the second processing stage shown ($410_2$) is omitted, and processing stage $410_1$ and processing stage $410_n$ are linked directly. Likewise, in control unit 513 and PPU 514 in FIG. 5, the second rank or stage of each sub-pipeline is omitted and only sub-pipeline stages '1' and 'm' are employed. The pipeline architecture in this example implements the processing function 'G' over a single iterative loop defined by:

input: $x_1$
for i=1 to 3 do
$x_{i+1}=G(x_i)$
return $x_4$ spread over two sub-pipeline processing stages. Thus, a thread or data portion must propagate through two sub-pipeline processing stages for one processing iteration of the algorithm to be completed. It should be understood that a different number of sub-pipeline stages for each iteration can be employed.

Table 900 illustrates operations over at least 12 clocking periods of the processing function G. Table 900 includes nine columns. A first column of table 900 indicates a clock cycle. Each clock row in table 900 indicates a current state or snapshot of the processing stages and sub-pipelines of the entire pipeline architecture. For example, the first clock cycle row, indicated by the row for clock '1,' includes two processing stages (1, 2) and four total sub-pipeline stages (i.e. two sub-pipeline stages for each processing stage).

Although any number of data portions, such as D1-D4, can be employed in the discussion for FIG. 9, in this example only four data threads are discussed for clarity.

Each buffer portion of the associated processing stages or sub-pipeline stages is tied to a clock signal. The clock cycle time could be a predetermined number of seconds, microseconds, nanoseconds, and the like, depending upon the clock period or frequency. For example, the buffer portions can comprise flip flop elements, each sharing a common clocking signal. The values for each entry in table 900 with the exception of 'gate open' and 'thread exit' represent the values contained in the associated buffer portions at the end of the clock cycle. The 'gate open' and 'thread exit' table values represent signal values at the beginning of the clock cycle.

A second column of table 900 indicates a processing stage, and a third column in table 900 indicates a sub-pipeline stage. In this example, the number of processing stages in the pipeline architecture is n=2, the number of sub-pipeline stages (for each processing stage) is m=2, and the final iteration count is FI=3. Thus, the number of threads in the entire pipeline architecture of this example is n*m=4. A fourth column in table 900 indicates the data thread, D1-D4, organized by row into a specific processing stage/sub-pipeline stage slot. The data thread label (D1-D4) uniquely identifies a particular data portion as it propagates through the pipeline architecture.

The fifth column of table 900 refers to a propagated status included in the various buffer portions of the control sub-pipelines of each processing stage which track the buffer full status, such as found in the buffer full sub-pipeline (such as buffers $520_{1-m}$) of control unit 513 of FIG. 5. The sixth and seventh columns of table 900 refer to statuses indicated by particular links in the sub-pipelines of the processing stages of the pipeline architecture. For convenience, the designations found in the discussion for FIG. 7 will be used in this example. Thus, links $432_{1-n}$ represent a 'gate open' status and link 536 represents a 'thread exit' status, although other designations and statuses can be used. Also in this example, 'gate open' status is true when links $432_{1-n}$ are a '1' value and false when $432_{1-n}$ are a '0' value. It should be understood that the link numbers/designators used in FIG. 5 and referenced above can be applied to any processing stage, not just processing stage $410_n$ as found in FIG. 5. The eighth and ninth columns of table 900 refer to propagated statuses included in the various buffer portions of the control sub-pipelines of each processing stage, such as found in the iteration counter sub-pipeline (such as buffers $530_{1-m}$) and thread counter sub-pipeline (such as buffers $540_{1-m}$) of control unit 513.

Referring now to the operation described in table 900 of FIG. 9, elements of FIG. 4 and FIG. 5 will be referenced. For example, a pipeline architecture such as found in FIG. 4 can be employed, but with two processing stages instead of the three shown in FIG. 4. Thus, processing stage $410_2$ can be omitted from this discussion regarding table 900, and only linked versions of processing stages $410_1$ and $410_n$ are discussed. Also, the detailed view of exemplary processing stage $410_n$ found in FIG. 5 for control unit 513 and PPU 514 will be referenced, and each of processing stages $410_1$ and $410_n$ can employ the features of control unit 513 and PPU 514.

During the first clock cycle of table 900, such as clock 1, data D1 enters first processing stage $410_1$ over link $431_1$ and since 'gate open' indicates true, then multiplexer $412_1$ routes data D1 over link $421_1$ to PPU $414_1$. After processing by logic $550_1$ of PPU 514 for first processing stage $410_1$ the processed data D1 (thread D1) is stored in buffer $560_1$. Responsively, the 'pipe full' buffer $520_1$ of control unit 513 for first processing stage $410_1$ is set to true, the iteration counter value is updated to 1 and stored in buffer $530_1$ and the thread counter value is updated to 1 and stored in buffer $540_1$. The symbol 'x' is used for the other buffers to denote a 'do not care' value.

During clock 2, thread D1 moves down the sub-pipeline stage for processing by logic $550_2$ and into buffer $560_2$ of PPU 514 for first processing stage $410_1$. The 'pipe full,' 'iteration count,' and 'thread count' values follow thread D1 by moving down the sub-pipeline stage of control unit 513 for first processing stage $410_1$ and into buffers $520_2$, $530_2$, and $540_2$, respectively. Data D2 enters first processing stage $410_1$ over link $431_1$ and since 'gate open' indicates true, then multiplexer $412_1$ routes data D2 over link $421_1$ to PPU $414_1$. After processing by logic $550_1$ of PPU 514 for first processing stage $410_1$, the processed data D2 (thread D2) is stored in buffer $560_1$. Responsively, the 'pipe full' buffer $520_1$ of control unit 513 for first processing stage $410_1$ is set to true, the iteration counter value is updated to 1 and stored in buffer $530_1$, and the thread counter value is updated to 1 and stored in buffer $540_1$ of control unit 513 for first processing stage $410_1$.

During clock 3, thread D1 exits first processing stage $410_1$ and enters second processing stage $410_n$ since 'gate open' is true for second processing stage 410. Data D1 enters second processing stage $410_n$ over link $431_n$ and since 'gate open' indicates true, then multiplexer $412_n$ routes data D1 over link $421_n$ to PPU 414. After processing by logic $550_1$ of PPU 514 for second processing stage $410_n$, the processed thread D1 is stored in buffer $560_1$ of PPU 514 for second processing stage $410_n$. Responsively, as in operation 605 of FIG. 6, the iteration counter value of thread D1 is updated to 2 and stored in buffer $530_1$ of control unit 513 for second processing stage 410. As in operation 706 of FIG. 7, the thread counter value for the first sub-pipeline stage of first processing unit $410_1$ is set to 1 since (!pipe full and !thread exit) is true in operation 702. This thread counter value indicates the number of active threads in sub-pipeline stage 1 of both first processing stage $410_1$ and second processing stage $410_n$. The thread counter value in buffer $540_1$ of second processing stage $410_n$ is 1 since there is only one active thread in sub-pipeline stage 1 of second processing stage $410_n$. Thread D2 follows the same transition as thread D1 did in the previous clock cycle.

During clock 4, data D3 enters first processing stage $410_1$ over link $431_1$ and since 'gate open' indicates true, then multiplexer $412_1$ routes data D3 over link $421_1$ to PPU $414_1$. After processing by logic $550_1$ of PPU 514 for first processing stage $410_1$, the processed data D3 (thread D3) is stored in buffer $560_1$. Responsively, the 'pipe full' buffer $520_1$ of control unit 513 for first processing stage $410_1$ is set to true, and the iteration counter value is updated to 1 and stored in buffer $530_1$ for first processing stage $410_1$. Since there are now two active threads (D2, D3) in sub-pipeline stage 1 for each of first processing stage $410_1$ and second processing stage $410_n$, the thread counter value stored in buffer $540_1$ for first processing stage $410_1$ is updated to 2. Thread D1 moves down the sub-pipeline stage into buffer $560_n$, after processing by logic $550_m$. Thread D2 exits first processing stage $410_1$ and enters second processing stage $410_n$ since 'gate open' is true for second processing stage $410_n$. As in operation 605 of FIG. 6, the iteration counter value for thread D2 is updated to 2 and stored in buffer $530_1$ for second processing stage $410_n$. Since there is only one active thread in sub-pipeline stage 1 of second processing stage $410_n$, the thread counter value for D2 is 1, and stored in buffer $540_1$ of second processing stage $410_n$.

During clock 5, data D4 enters first processing stage $410_1$ over link $431_1$ and since 'gate open' indicates true, then multiplexer $412_1$ routes data D4 over link $421_1$ to PPU $414_1$. After processing by logic $550_1$ of PPU 514 for first processing stage $410_1$, the processed data D4 (thread D4) is stored in buffer $560_1$. Responsively, the 'pipe full' buffer $520_1$ of control unit 513 for first processing stage $410_1$ is set to true, and the iteration counter value is updated to 1 and stored in buffer $530_1$ for first processing stage $410_1$. Since there are now two active threads (D1, D4) in sub-pipeline stage 1 for each of first processing stage $410_1$ and second processing stage $410_n$, the thread counter value stored in buffer $540_1$ for first processing stage $410_1$ is updated to 2. The control signal values for the other threads follow the same procedures as before. Note that 'gate open' is no longer true for second processing stage $410_n$, and implies that sub-pipeline stage 1 of second processing stage $410_n$ can no longer accept new incoming data/threads.

During clock 6, thread D1 enters the final sub-pipeline stage and has a final iteration counter value. The 'gate open' value for both first processing stage $410_1$ and second processing stage $410_n$ are false since neither can accept new incoming data/threads into a respective sub-pipeline stage 1.

During clock 7, thread D1 exits pipeline architecture 400, and 'thread exit' is true. Thread D2 enters the final sub-pipeline stage and has a final iteration counter value. Since thread D1 exited pipeline architecture 400, then 'gate open' is true for both first processing stage $410_1$ and second processing stage $410_n$. Responsively, thread D4 enters second processing stage $410_n$. The thread counter value for buffer $540_1$ of first processing stage $410_1$ is reduced to 1 since only one active thread is in sub-pipeline stage 1 of both first processing stage $410_1$ and second processing stage $410_n$.

During clock 8, thread D2 exits pipeline architecture 400, and 'thread exit' is true. Thread D3 enters second processing stage $410_n$ while thread D4 enters sub-pipeline stage 2 of second processing stage $410_n$. The thread counter value in buffer $540_1$ of first processing stage $410_1$ is reduced to 1 since only one active thread is in sub-pipeline stage of both first processing stage $410_1$ and second processing stage $410_n$.

During clock 9, thread D3 enters the final sub-pipeline stage and has a final iteration counter value. During clock 10, thread D3 exits pipeline architecture 400 and 'thread exit' is true. Thread D4 enters the final sub-pipeline stage and has a final iteration counter value. The thread counter value in buffer $540_1$ of first processing stage $410_1$ is reduced to 0 since there are no active threads in sub-pipeline stage 1 of both first processing stage $410_1$ and second processing stage $410_n$. The thread counter value in buffer $540_1$ of second processing stage $410_n$ is also reduced to 0 since there are no active threads in sub-pipeline stage 1 of second processing stage $410_n$. During clock 11, thread D4 exits pipeline architecture 400 and 'thread exit' is true. During clock 12, 'thread exit' is false. After clock 12, all processing has ceased since all data portions or data threads have been processed by pipeline architecture 400 which employs two processing stages in this example.

Figure 10:
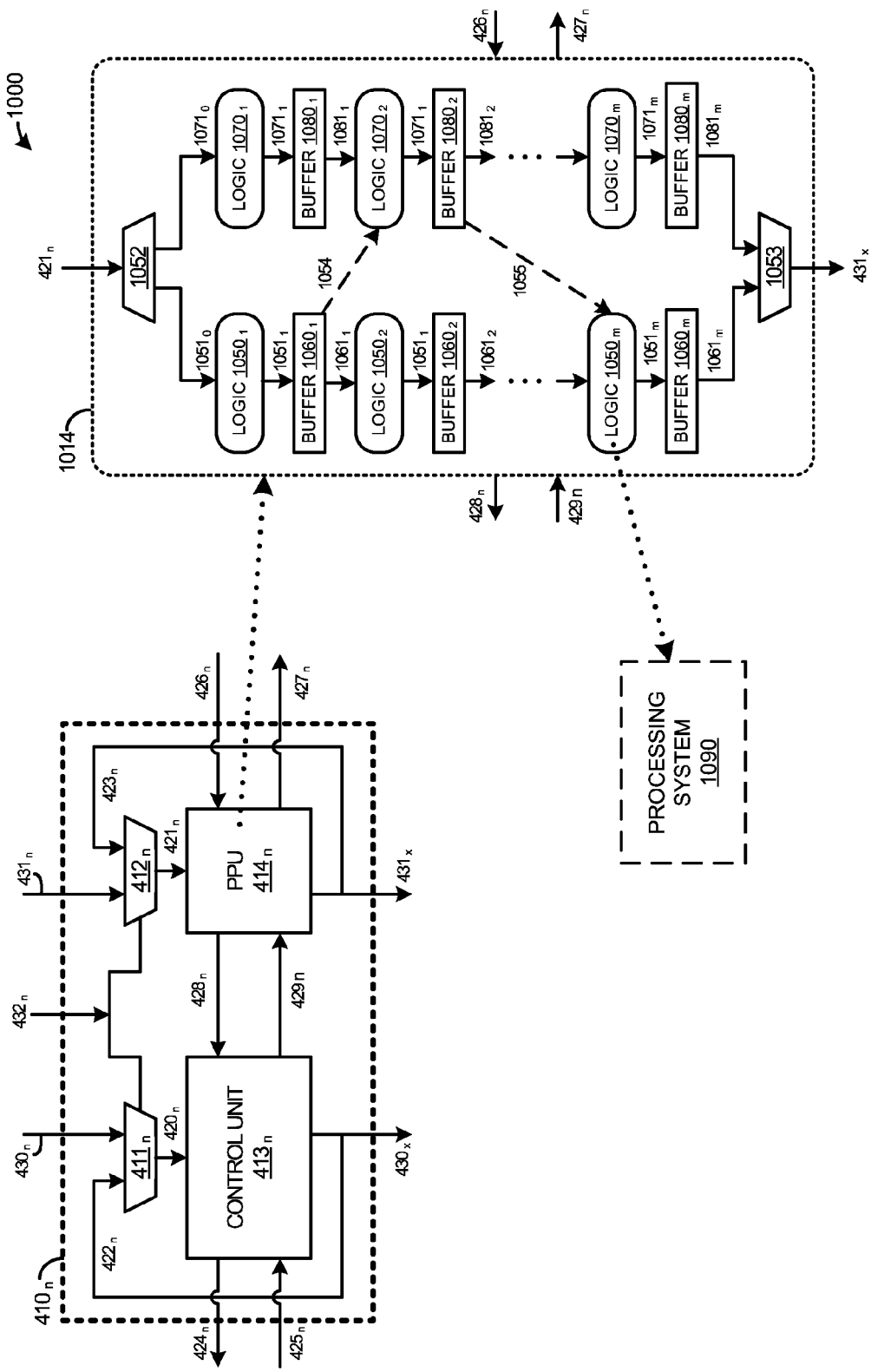
FIG. 10 is a block diagram illustrating a pipeline processing stage.

FIG. 10 is a block diagram illustrating pipeline processing stage $410_n$. FIG. 10 illustrates another example of any of processing stages $410_{1-n}$ of FIG. 4, or of any of processing stages 120-122 of FIG. 1. In FIG. 10, PPU 1014 is illustrated which includes dual sub-pipeline pathways. In this example, each sub-pipeline pathway can implement a different function or processing algorithm. Multiplexer 1052 selects a sub-pipeline pathway into which a data thread is introduced. Dynamic selection of an algorithm allows architecture 400 to process multiple algorithms concurrently such as both block cipher encryption and decryption. This selection can occur only during initial entry into a first sub-pipeline stage, as done by multiplexer 1052. This selection can also occur after every sub-pipeline stage, such as indicated by paths 1054 and 1055. Paths 1054 and 1055 can also include multiplexers or other logic for directing data threads between either pathway. Also, buffer units $1060_{1-m}$ and $1080_{1-m}$ may share buffer logic in order to conserve resources. Multiplexer 1053 can select a pathway from which to output data threads for exit of a pipeline architecture, for delivery to another processing stage, or for feedback into the same processing stage.

Multiplexer 1052, or other multiplexers in processing architecture 1000, can select the current pathway based on an iteration count, an algorithm select header added to data input 130, or other signals. An algorithm select header can be introduced with data into pipeline architecture 1000, and the algorithm select header can propagate with the data through pipeline architecture 1000. The algorithm select header can comprise one or more bits, and indicate a processing algorithm to be used for that particular piece of data. A single bit can be employed as an algorithm select header in pipeline architecture 1000 having two possible paths or algorithms, with a '1' indicating a first algorithm and a '0' indicating a second algorithm. This header bit can also control multiplexing logic included between each processing sub-pipeline to select from among paths 1054 and 1055.

Also shown in FIG. 10 is processing system 1090. Instead of logic, a processing system comprising a microprocessor, logic device, signal processor, or other processing system can be employed for any of logic $1050_{1-m}$ or logic $1070_{1-m}$. Processing system 1090 can implement a dynamic processing function which can be altered or changed based on an iteration count, algorithm select header, or other signals. In other examples, processing system 1090 can select a function based on the algorithm desired. Thus, PPU 1014 can implement a variety of data processing algorithms and dynamically change between any, such as FFT, AES encryption/decryption, block cipher encryption, block cipher decryption, signal processing, hash functions, or other algorithms. The selection between functions can be received from user input, from selection pins, or based on a header accompanying the data threads being processed, among others.

In some examples, PPU 1014 is employed as PPU 514 of FIG. 5, and further control logic can be employed in control unit 513 to select the various sub-pipeline pathways, to select a processing system function or algorithm, and to control multiplexers 1052-1053. Although two sub-pipeline pathways are shown in FIG. 10, any number of sub-pipeline pathways can be employed.

Figure 11:
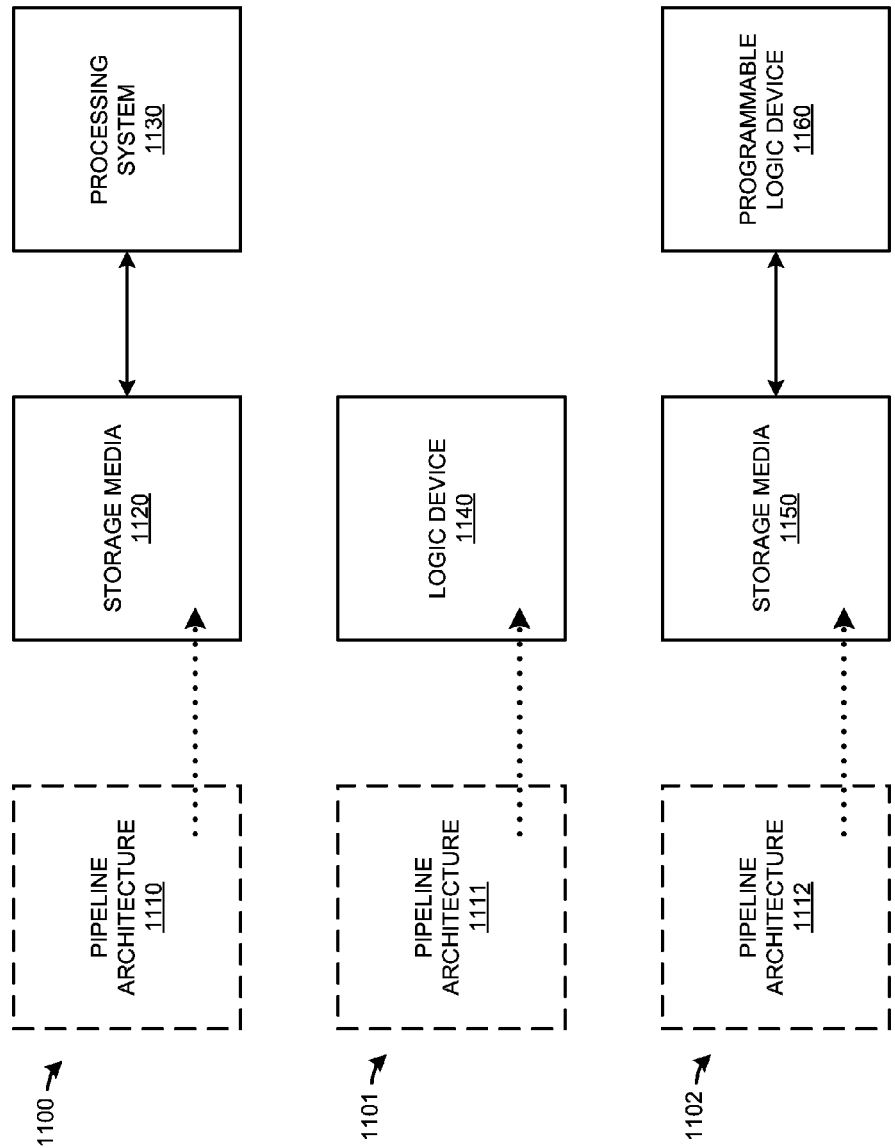
FIG. 11 includes block diagrams illustrating example pipeline processor configurations.

FIG. 11 includes block diagrams illustrating example pipeline processor configurations. Specifically, FIG. 11 includes pipeline processor configurations 1100, 1101, and 1102. Pipeline architectures 1110-1112 can comprise any of the pipeline architecture examples discussed herein, such as pipeline architecture 110 of FIG. 1 or pipeline architecture 400 of FIG. 4, although other configurations can be employed, including the detailed elements shown in FIGS. 5 and 10.

In a first example pipeline processor configuration, pipeline processor configuration 1100 is shown. In this example, pipeline architecture 1110 is stored on storage media 1120. Processing system 1130 communicates with storage media 1120 to retrieve pipeline architecture 1110 from storage media 1120.

Processing system 1130 can comprise one or more microprocessors and other circuitry that retrieves and executes pipeline architecture 1110 from storage media 1120. Processing system 1130 can be implemented within a single processing device but can also be distributed across multiple processing devices or sub-systems that cooperate in executing program instructions. Examples of processing system 1130 include general purpose central processing units, application specific processors, and logic devices, as well as any other type of processing device, combinations, or variations thereof.

Storage media 1120 can comprise any computer readable storage media readable by processing system 1130 and capable of storing pipeline architecture 1110. Storage media 1120 can include volatile and nonvolatile, removable and non-removable media implemented in any method or technology for storage of information, such as computer readable instructions, data structures, program modules, or other data. In addition to storage media, in some implementations storage media 1120 can also include communication media over which pipeline architecture 1110 can be communicated. Storage media 1120 can be implemented as a single storage device but can also be implemented across multiple storage devices or sub-systems co-located or distributed relative to each other. Storage media 1120 can comprise additional elements, such as a controller, capable of communicating with processing system 1130. Examples of storage media include random access memory, read only memory, magnetic disks, optical disks, flash memory, virtual memory and non-virtual memory, magnetic cassettes, magnetic tape, magnetic disk storage or other magnetic storage devices, or any other medium which can be used to store the desired information and that can be accessed by an instruction execution system, as well as any combination or variation thereof, or any other type of storage media. In no case is the storage media a propagated signal.

Pipeline architecture 1110 can be implemented in program instructions and among other functions can, when executed by processing system 1130, direct processing system 1130 to process data in a series of processing stages, iterate processing of data by looping data in processing stages, process data in sub-pipelines, among other operations as discussed herein. Additional software can be included on storage media 1120, and can include additional processes, programs, or components, such as operating system software, database software, or application software. Pipeline architecture 1110 can also comprise firmware or some other form of machine-readable processing instructions executable by processing system 1130.

In general, pipeline architecture 1110 can, when loaded into processing system 1130 and executed, transform processing system 1130 overall from a general-purpose computing system into a special-purpose computing system customized to process data in a series of processing stages, iterate processing of data by looping data in processing stages, process data in sub-pipelines, among other operations. Encoding pipeline architecture 1110 on storage media 1120 can transform the physical structure of storage media 1120. The specific transformation of the physical structure can depend on various factors in different implementations of this description. Examples of such factors can include, but are not limited to the technology used to implement the storage media of storage media 1120 and whether the computer-storage media are characterized as primary or secondary storage. For example, if the computer-storage media are implemented as semiconductor-based memory, pipeline architecture 1110 can transform the physical state of the semiconductor memory when the program is encoded therein. For example, pipeline architecture 1110 can transform the state of transistors, capacitors, or other discrete circuit elements constituting the semiconductor memory. A similar transformation can occur with respect to magnetic or optical media. Other transformations of physical media are possible without departing from the scope of the present description, with the foregoing examples provided only to facilitate this discussion.

In a second example pipeline processor configuration, pipeline processor configuration 1101 is shown. In this example, pipeline architecture 1111 is implemented in logic device 1140. Logic device 1140 can comprise a fabricated logic device, an application specific integrated circuit (ASIC) device, application-specific standard products (ASSP), or other integrated circuit device. In some examples, pipeline architecture 1111 is implemented in one or more discrete logic devices which comprise logic device 1140. Logic device 1140 can include logic, logic gates, combinatorial logic, sequential logic, signal interconnect, transmission circuitry, clock circuitry, or other elements implemented in one or more semiconductor devices.

In a third example pipeline processor configuration, pipeline processor configuration 1102 is shown. In this example, pipeline architecture 1112 is stored on storage media 1150. Programmable logic device 1160 communicates with storage media 1150 to retrieve pipeline architecture 1112 from storage media 1150.

Programmable logic device 1160 can comprise a field programmable gate array (FPGA) which can include configurable logic blocks (CLB), look up tables (LUT), buffers, flip flops, logic gates, input/output circuitry, or other elements packaged in one or more semiconductor devices. Programmable logic device 1160 can receive pipeline architecture from storage media 1150 using a signaling interface, joint test action group (JTAG) serial interface, parallel interface, or other communication interface.

In this example, pipeline architecture 1112 can comprise program instructions such as a netlist or binary representation which are stored on storage media 1150 and are capable of programming programmable logic device 1160. A source code representation of pipeline architecture 1112 can be employed to create or distribute a 'core' which implements pipeline architecture 1112 using a hardware description language (HDL) such as Verilog or very high speed integrated circuit hardware description language (VHDL). In source code form, pipeline architecture 1112 is typically processed and transformed into a netlist representation suitable for further transformation via place-and-route and mapping processes to generate a gate-level binary representation suitable for programming a programmable logic device, such as an FPGA.

The transformation from source code to netlist or binary forms typically includes specifying various parameters to configure pipeline architecture 1112. These parameters can include the number of processing stages 'n' and the number of sub-pipeline stages 'm' among other parameters. The maximum iteration count or iteration count threshold can also be parameter used in generation of the netlist or binary form, although this parameter can also be dynamic and input to pipeline architecture 1112 via external pins of programmable logic device 1160 or a user interface implemented by programmable logic device 1160.

The binary form of pipeline architecture 1112 is stored on storage media 1150. Storage media 1150 can comprise an electrically erasable programmable read only memory (EEPROM), static random access memory (SRAM), phase change memory, magnetic RAM, flash memory, or other non-volatile storage device. Typically, during a startup, power on, or boot process, programmable logic device 1160 reads the binary form of pipeline architecture 1112, along with any other overhead and programming instructions, to program pipeline architecture 1112 into programmable logic device 1160, including any associated input/output circuitry. Storage media 1150 can comprise elements discussed for storage media 1120.

The included descriptions and figures depict specific embodiments to teach those skilled in the art how to make and use the best mode. For the purpose of teaching inventive principles, some conventional aspects have been simplified or omitted. Those skilled in the art will appreciate variations from these embodiments that fall within the scope of the invention. Those skilled in the art will also appreciate that the features described above can be combined in various ways to form multiple embodiments. As a result, the invention is not limited to the specific embodiments described above, but only by the claims and their equivalents.

What is claimed is:

1. A pipeline architecture comprising:
   a plurality of processing stages linked in series, each of the plurality of processing stages configured to selectively iterate processing of corresponding data and propagate the corresponding data with a corresponding iteration count according to at least a state of a further processing stage, the corresponding iteration count indicating a number of times the corresponding data was iteratively processed; and
   the further processing stage preceded by the plurality of processing stages and configured to iteratively process the data in the further processing stage a number of times based at least on an iteration count propagated to the further processing stage by a preceding processing stage that indicates how many times the data was iteratively processed as the data propagated through the plurality of processing stages.

2. The pipeline architecture of claim 1, comprising:
   the further processing stage configured to indicate to the plurality of processing stages a propagation flag instructing each of the plurality of processing stages to propagate the corresponding data and the corresponding iteration count to a subsequent processing stage.

3. The pipeline architecture of claim 1, comprising:
   the plurality of processing stages configured to propagate the corresponding data responsive to at least the iteration count of the further processing stage reaching an iteration threshold in the further processing stage.

4. The pipeline architecture of claim 1, comprising:
   the further processing stage configured to indicate a propagation flag to the plurality of processing stages that the data of the further processing stage has reached an iteration count threshold in the further processing stage.

5. The pipeline architecture of claim 1, comprising:
   the plurality of processing stages each further comprising one or more sub-pipeline stages linked in series that process the corresponding data as the corresponding data propagates through each of the plurality of processing stages.

6. The pipeline architecture of claim 5, comprising:
each of the plurality of processing stages configured to maintain a thread count for its associated one or more sub-pipeline stages indicating how many of the associated one or more sub-pipeline stages are processing the data;
each of the plurality of processing stages configured to control propagation of the data by the associated one or more sub-pipeline stages based on at least the thread count.

7. The pipeline architecture of claim 1, wherein each of the corresponding iteration counts comprise a multi-dimensional iteration count comprising a plurality of loop counters.

8. The pipeline architecture of claim 1, comprising:
the plurality of processing stages and the further processing stage configured to select a processing algorithm for the corresponding data based on at least the corresponding iteration count.

9. The pipeline architecture of claim 1, comprising:
the plurality of processing stages and the further processing stage configured to select a processing algorithm for the corresponding data based on at least a header propagated with the corresponding data through the plurality of processing stages and the further processing stage.

10. The pipeline architecture of claim 1, wherein the pipeline architecture comprises a logic device.

11. An apparatus comprising:
a plurality of processing stages linked in series, each of the plurality of processing stages configured to selectively iterate processing of corresponding data and propagation of the corresponding data with corresponding iteration counts according to at least a state of a further processing stage; and
the further processing stage preceded by the plurality of processing stages and configured to iteratively process the data in the further processing stage a number of times based at least in part on an iteration count propagated to the further processing stage by a preceding processing stage that indicates how many times the data was iteratively processed as the data propagated through the plurality of processing stages.

12. The apparatus of claim 11, wherein each of the corresponding iteration counts indicate a number of times the corresponding data was iteratively processed, and comprising:
the further processing stage configured to indicate to the plurality of processing stages a propagation flag instructing each of the plurality of processing stages to propagate the corresponding data and the corresponding iteration count to a subsequent processing stage.

13. The apparatus of claim 11, comprising:
the plurality of processing stages configured to propagate the corresponding data responsive to at least the iteration count of the further processing stage reaching an iteration threshold in the further processing stage.

14. The apparatus of claim 11, comprising:
the further processing stage configured to indicate a propagation flag to the plurality of processing stages that the data of the further processing stage has reached an iteration count threshold in the further processing stage.

15. The apparatus of claim 11, comprising:
the plurality of processing stages each further comprising one or more sub-pipeline stages linked in series that process the corresponding data as the corresponding data propagates through each of the plurality of processing stages.

16. The apparatus of claim 15, comprising:
each of the plurality of processing stages configured to maintain a thread count for its associated one or more sub-pipeline stages indicating how many of the associated one or more sub-pipeline stages are processing the corresponding data;
each of the plurality of processing stages configured to control propagation of the corresponding data by the associated one or more sub-pipeline stages based on at least the thread count.

17. The apparatus of claim 11, wherein each of the iteration counts comprise a multi-dimensional iteration count comprising a plurality of loop counters.

18. The apparatus of claim 11, comprising:
the plurality of processing stages and the further processing stage configured to select a processing algorithm for the corresponding data based on at least the corresponding iteration count.

19. The apparatus of claim 11, comprising:
the plurality of processing stages and the further processing stage configured to select a processing algorithm for the corresponding data based on at least a header propagated with the corresponding data through the plurality of processing stages and the further processing stage.

20. The apparatus of claim 11, wherein the apparatus comprises a logic device.

21. An apparatus comprising:
a non-transitory computer readable storage media; and
program instructions stored on the computer readable storage media that, when used to configure a programmable logic device, establish a pipeline architecture on the programmable logic device, the pipeline architecture comprising:
a plurality of processing stages linked in series that selectively iterate processing of corresponding data as the corresponding data propagates with corresponding iteration counts through the plurality of processing stages; and
at least one other processing stage linked in series with and preceded by the plurality of processing stages that iteratively processes the corresponding data a number of times based at least in part on an iteration count propagated by a preceding processing stage that indicates how many times the corresponding data was iteratively processed as the corresponding data propagated through the plurality of processing stages.

22. An apparatus comprising:
a non-transitory computer readable storage media; and
program instructions stored on the computer readable storage media and comprising:
a plurality of processing stages linked in series that iteratively process associated portions of data as the associated portions of the data propagates through the plurality of processing stages, with the propagation among the plurality of processing stages directed according to at least a state of a further processing stage; and
the further processing stage linked in series with and preceded by the plurality of processing stages that iteratively processes corresponding data a number of times based at least in part on an iteration count propagated to the further processing stage by a preceding processing stage that indicates how many times the corresponding data was iteratively processed as the corresponding data propagated through the plurality of processing stages.

* * * * *